(12) United States Patent
Van Overveld

(10) Patent No.: US 6,407,744 B1
(45) Date of Patent: Jun. 18, 2002

(54) COMPUTER GRAPHICS BUMP MAPPING METHOD AND DEVICE

(75) Inventor: Cornelis W. A. M. Van Overveld, Eindhoven (NL)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/190,669

(22) Filed: Nov. 12, 1998

(30) Foreign Application Priority Data

Nov. 14, 1997 (EP) .............................. 97203545

(51) Int. Cl.[7] .............................................. G06T 15/50
(52) U.S. Cl. ...................................... 345/584; 345/582
(58) Field of Search ................................. 345/426, 430, 345/429, 582, 584

(56) References Cited

U.S. PATENT DOCUMENTS

| | | | | |
|---|---|---|---|---|
| 5,659,671 A | | 8/1997 | Tannenbaum et al. ...... 395/126 |
| 5,880,736 A | * | 3/1999 | Peercy et al. ................. 345/426 |
| 5,900,881 A | * | 5/1999 | Ikedo ........................... 345/426 |
| 5,949,424 A | * | 9/1999 | Cabral et al. ................. 345/426 |
| 6,031,542 A | * | 2/2000 | Wittig ........................... 345/426 |
| 6,078,334 A | * | 6/2000 | Hanaoka et al. ............. 345/430 |
| 6,081,274 A | * | 6/2000 | Shiraishi ....................... 345/426 |

\* cited by examiner

*Primary Examiner*—Michael Razavi
*Assistant Examiner*—Motilewa Good-Johnson
(74) *Attorney, Agent, or Firm*—Russell Gross

(57) ABSTRACT

In computer graphics the image of a surface patch is computed, including specular reflections (mirror-like reflections) from the surface patch. A bump map is used to perturb the normal to a surface, so as to simulate bumps on the surface, which cause specular reflection highlights. The bump map assigns a perturbation vector to each point on several different surface patches and the same perturbation is applied to corresponding points on different surface patches, irrespective of orientation and shape differences between the surface patches. Preferably, the perturbation vector is always parallel to the viewscreen direction, irrespective of the direction of the normal that is being perturbed.

5 Claims, 2 Drawing Sheets

COMPUTER GRAPHICS BUMP MAPPING METHOD AND DEVICE

BACKGROUND OF THE INVENTION

The invention relates to computer graphics and in particular to rendering of specular reflection from surface unevenness ("bumps").

"Bump mapping" techniques are known for example from an article by Mark Peercy, John Airey and Brian Cabral, titled "Efficient Bump Mapping Hardware", published in the Siggraph proceedings 1997. This article will be referred to as "Peercy et al.". In bump mapping one considers a predetermined two dimensional height field f(u,v) which is used to "project" bumps onto different surfaces. For each such surface in three dimensional space, a mapping is defined which assigns each point "r" on the surface to a respective location (u,v) in the height field. The surface is considered to be displaced along its normal at the point "r" by an amount equal to the value of the height field at the location assigned to that point "r".

When a computer graphics image of such a surface is generated this leads to variations in reflections from the surface. For a realistic effect, it is highly desirable to account for specular reflections (mirror-like reflections) from the bumps. This leads to sharply defined intensity maxima ("highlights").

The basic idea of bump mapping is that only the effect of bumps on local surface orientation is used to compute the appearance of the surface, as far as it affects diffuse and/or specular reflection from the surface. Changes in the positions in the image where points on the surface are shown are not accounted for.

The surface orientation is represented by the normal N to the surface at each point "r" on the surface. The normal N, as perturbed by the bumps, can be used to compute specular reflection. This reflection is maximal when the normal N coincides with the half angle vector H (the half angle vector H is the unit vector bisecting the angle between the lightsource direction at the point "r" and the direction from which the point "r" is viewed.) The further the normal N diverges from the half angle vector H, the more the specular reflection diminishes. This can be modeled using the well known Phong model, by computing the scalar product of the half angle vector H and the perturbed normal and taking the exponent to the power B (B<1) of the result.

The computation of the perturbed normal has to be performed very carefully. Overly drastic approximations easily result in artifacts that can be discerned by the human viewer. For example, it is conventional in computer graphics to approximate the surface by a set of abutting flat polygons. If the respective normals to these polygons where used as a starting point for the computation, the human viewer would readily discern the polygons. Therefore, the normal is continuously interpolated over the polygons.

Conventionally, the perturbed normal is determined by computing the coordinates of a number of points on the surface as displaced according to the height field and by computing the normal to a plane fitted through such points. It has been found that this avoids artifacts, but this method is computationally very expensive.

It is also possible to compute the normal locally as a function of the point "r", using the spatial derivatives of the height field f(ti,v) and the mapping. Peercy et al. show that the perturbed normal at the point "r" can be obtained approximately by adding a perturbation vector in a direction perpendicular to the unperturbed normal. This perturbation vector at a point "r" is a function of the spatial derivative of the height field at the corresponding location in the height field and the spatial derivative of the mapping by which the height field is projected onto the surface at the point "r". However, considerable computational effort is needed to determine how this perturbation vector works out for a given position dependent mapping.

It is desirable to simplify this calculation, but again, approximations aimed at simplifying the computation of the perturbation vector easily result in discernable artifacts. For example, it is known to lead to artifacts if one takes each polygon of the set of polygons that is used to approximate the surface, and linearizes the relation between the spatial derivatives of the height field and the perturbation vector in each polygon.

Peercy et al. propose to avoid artifacts and reduce the computational effort by computing the perturbation vector in a tangent coordinate system of the surface. In this coordinate system the unperturbed normal is position independent and the direction of the perturbation vector is independent of the spatial derivative of the mapping. However, in order to compute the scalar product of the perturbed normal and the halfangle vector H, as needed for specular reflection, the halfangle vector H has to be transformed into the tangent coordinate system. This transformation of H depends on the spatial derivatives on the mapping and is computationally expensive.

Again, an approximation using one respective H for each polygon results in discernible artifacts. Therefore, Peercy et al. propose to simplify the determination of H by computing the transformation of H for a limited number of points on the surface and to interpolate H between these points. However, the interpolation of H and the remaining transformations of H still require a considerable amount of computational effort.

It is an object of the invention to reduce this amount of computational effort.

SUMMARY OF THE INVENTION

The method according to the invention is characterized in that the direction in which the normal is perturbed in different surface patches, under control of the same location in the bump map is the same direction irrespective of the shape and orientation of each surface patch. Thus, the computational effort needed to transform the perturbation vectors is avoided. Highlight effects due to the shape of the unperturbed surface patch are rendered correctly, but the specular reflection patterns (pattern of highlights) due to the bump map from different surface patches will not correspond to the same height variations. In fact it is even possible that there is no possible height variation that could cause the pattern (this is called an inconsistent pattern). The invention is based on the discovery that human observers experience patterns of highlights due to specular reflection on a rough surface as realistic without being sensitive to the direction and the consistency of such patterns of highlights across the surface. This insensitivity is probably functional to help humans understand surface shape largely independently of lightsource direction.

In addition it has been found that the human observer experiences as realistic an animated sequence of images (time-varying position and orientation of the surface patches) which all use the same direction of perturbations for a time varying surface patch. Hence, no artifacts are experienced even in animation.

DESCRIPTION OF THE PREFERRED EMBODIMENTS

The fundamentals of specular reflection and bump mapping in computer graphics will be recalled first.

Figure 1:
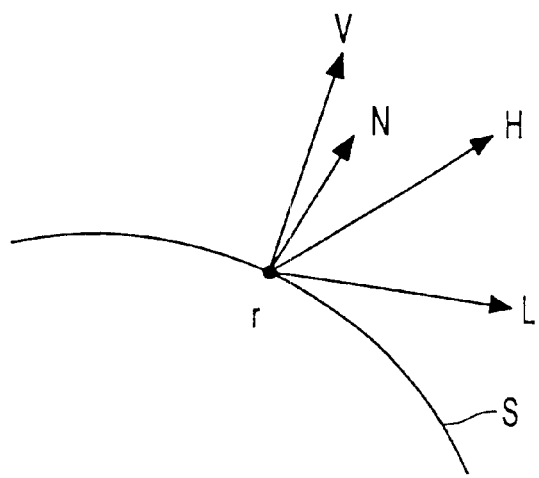
FIG. 1 shows cross-section of a geometry of a surface patch

FIG. 1 shows a geometry for explaining computation of reflection from a surface patch S containing a point r, cross-sected through a cross-section plane which contains a unit vector V along a line of sight from a viewpoint to the point r and a unit vector L along a line of lighting from a lightsource to the point r. FIG. 1 also shows the normal N to the surface patch N at the point r, projected onto the cross-section plane.

Moreover, a half angle vector H at the point r is shown, which bisects the angle between of the line of sight and the line of lighting and has unit length.

An often used model expression for the light reflected from the surface patch at the point r is a sum of two terms $$P_d*(N,L)+P_s*(N,H)^\beta$$

The first term accounts for diffuse reflection. It contains the product of a factor $P_d$ and the scalar product (N,L) of the normal and the unit vector L in the direction of the line of lighting (scalar product e.g. computable as the sum of the products of the vector-components of the two vectors). The factor $p_d$ is the diffuse color, usually a color vector containing three color components, each of which is a product of a surface color component and a lightsource color component.

The second term accounts for specular reflection according to the Phong model. The second term contains the product of a factor $p_s$ and a power $\beta$ of the scalar product (N,H) of the normal N and the half angle vector H. The factor $p_s$ is the specular color, usually a color vector; typically the color vector of the light source.

In general, specular reflection from a point r will be maximal if the normal N is in the "mirror direction": defined so that the line of lighting would be reflected into the line of sight by a plane mirror having the normal N of the surface patch S. Specular reflection will decrease rapidly as the normal N deviates from the mirror direction. This angle dependence is described by the power $\beta$ of the scalar product (N,H). If the mirror condition is met N and H coincide. In this case (N,H) equals 1 and so $(N,H)^\beta$ also equals 1. $\beta$ is much larger than 1. As the line of sight and the line of lighting relative to the surface deviate more from the mirror condition, (N,H) will decrease further from 1 and $(N,H)^\beta$ will decrease rapidly.

Thus the second term will give rise to "highlights": sharply defined local reflection maxima near points where the surface patch S is oriented such that its normal N points into the mirror direction H.

Figure 2:
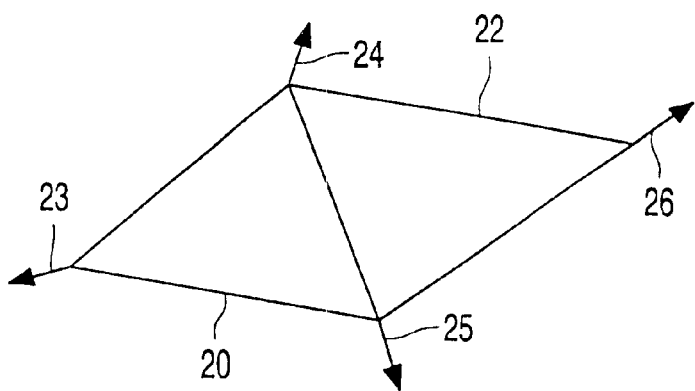
FIG. 2 shows a model of a surface patch

FIG. 2 shows a model of a surface patch used for computer graphics. The surface patch is modeled using two flat triangles 20, 22, which share two corners and the edge between these two corners. The model of the surface patch also contains vectors 23, 24, 25, 26 defined for the corners of the triangles 20, 22. The model of FIG. 2 uses two triangles by way of a simplified example. In practice, a model will contain many more triangles connected to form a mesh approximating a curved surface, or more, generally polygons.

When a computer graphics image of the surface patch shown in FIG. 2 is computed, one defines a viewpoint position (or direction) relative to the triangles and one ore more lightsource positions (or directions) relative to the triangles. The flat triangles 20, 22 are used to determine what point r in the model is visible at what location in the computer graphics image. Subsequently, the light contribution of that point r to the image is determined using the sum of diffuse and specular reflection.

For determining the light contribution, it is necessary to determine the normal vector N at the point r. To determine the normal, one does not use the normal to the flat triangle 20 to which the point r belongs, but a weighted average of the vectors 23, 24, 25, defined for the corners of that triangle 20. The weight assigned to the vector 23, 24, 25 defined for a corner decreases as a function of distance from the corner 23, 24, 25 , from 1 at the corner to zero at the edge of the triangle 20 opposite the corner 23, 24, 25. Thus, a continuously varying normal is defined from the surface patch, by interpolation between the vectors 23, 24, 25 art the corners.

The unit vector L in the direction of the line of lighting and the halfangle vector H are also computed. These vectors are often assumed to be constant over the surface patch (which corresponds to a lightsource and viewpoint located at infinity), but they could also be computed at the corners and interpolated over the triangles.

Any shape surface patch can be modeled in the aforementioned way. However, this would require an enormous computational effort if small details have to be included on the surface patch. This effort can be reduced by using bump mapping.

In bump mapping one considers a function f(u,v) of two texture coordinates u,v. This function is mapped onto the surface patch, that is a mapping is defined which assigns texture coordinates u(r), v(r) to each point r on the surface patch. (Conversely, this means that at least locally r may be considered a function of u and v: r(u,v)). Preferably, a separate linear mapping is used for each triangle or polygon 20, 22 used to construct the model. These linear mappings are selected so that in each instance where two of triangles 20, 22 shares an edge, the respective mappings of these two triangles yield the same u,v along that edge. Thus, the mapping will be continuous over the surface patch.

The function f defines a displacement d of the surface at the point r along the normal at that point:

$$d(r)=N(r)*f(u(r),v(r))$$

When all points on the surface patch are displaced by their displacement d and the function f varies from point to point, this will result in a perturbation of the normal at each point r. The idea of bump mapping is that this perturbed normal will be used for the computation of the reflected light instead of the unperturbed, interpolated normal. Otherwise, the computation remains the same: location in the image is still determined by the flat triangles.

The perturbed normal may be computed for example by computing the displacement d at a number of points r, and fitting a surface through the displaced points, the normal of the fitted surface being used to approximate the normal.

Another way is to compute the normal from the spatial derivatives of the mapping and of the function f(u,v). It has been shown that, in an approximation for small spatial derivatives $f_u=\partial f(u,v)/\partial u$ and $f_v=\partial f(u,v)/\partial v$ of f(u,v), the perturbed normal can be expressed as $$\alpha*(P_u \times P_v - f_u*(P_v \times N) + f_v(P_u \times N))$$

"×" denotes the vector product of two vectors. In this formula, $\alpha$ is a normalization factor which selected to ensures that the length of the perturbed normal is 1; this normalization factor may be calculated by inverting the length of the term between the brackets in the formula. The second and third terms within the bracket produce the perturbation of the normal, these terms are proportional to $f_u$ and $f_v$, the partial spatial derivatives of the function f with respect to the texture coordinates.

$P_u$ and $P_v$ are defined as the derivatives of the point r with respect to the texture coordinates u,v:

$$P_u = \partial r(u,v)/\partial u \text{ and } P_v = \partial r(u,v)/\partial v$$

In practice, a linear mapping is used for each triangle 20, 22 in the model. The spatial derivatives of such a linear mapping are position independent for each triangle 20, 22, but differ from triangle to triangle 20, 22. It has been found that this leads to visible artifacts. To avoid these artifacts, one may interpolate $P_u$ and $P_v$ (or $N \times P_u$ and $N \times P_v$) just like N: compute the values of the spatial derivatives $P_u$ and $P_v$ (or the vector products $N \times P_u$ and $N \times P_v$) at the corners of the triangle 20, 22 and interpolate them in the interior of the triangles 20, 22.

To create computer graphics images, one may determine $f_u$ and $f_v$ in advance, without knowing the shape and orientation of the particular surface patch onto the bump map will be projected.

However, in order to compute the perturbed normal for determining specular reflection from a particular surface patch, one also needs to compute $P_u$ and $P_v$ and to perform a computation using the spatial derivatives of the specific mapping function for that particular surface patch at every point on the surface patch. This is because the formula for the perturbation of the normal depends on the spatial derivatives of the function f and the spatial derivatives of the mapping $P_u$, $P_v$.

This requires considerable computational effort and it is desirable to find an approximation which reduces this effort without introducing degradation of the visual impression of the computer graphics image on the human viewer.

Such a reduction can be realized by using a perturbation "b" of the normal computed from a function f for one surface patch as a perturbation of the normal of other surface patches, irrespective of the shape of those surfaces and the mappings used to project the bump map onto those surface patches. That is, a mapping is still defined for each different surface patch, in order to define which location (u,v) is associated with any point r on the surface patch, but the perturbation b that is associated with that location (u,v) is added to the unperturbed normal N, without accounting for the different spatial derivatives of the different surface patches:

$$N_{pert} = \gamma * (N + b(u,v))$$

($\gamma$ is a normalization factor to ensure that the length $|N_{pert}|$ of the perturbed normal equals 1).

Of course, the specular reflections (highlights) produced by this approximation will not usually correspond to the displacement pattern f(u,v). In fact, it is even no longer guaranteed that these highlights correspond to a physically possible surface lighted everywhere by the same lightsource.

However, it has been discovered that the human visual system hardly, if at all, detects this. One may speculate about the reason for this. The human visual system uses the highlights as cues to get an impression of shape, but probably the way the human visual does this is more or less invariant for the direction of lighting and the consistency of that direction. This would explain why such an approximate specular reflection is not experienced as unrealistic.

Preferably, a two-dimensional perturbation vector b(u,v) is used, e.g. the gradient ($f_u$, $f_v$) of a two-dimensional function f(u,v), having for example only an x and a y component but no z-component (or a zero z component: $b_x = f_u, b_y = f_v, b_z = 0$)). This further reduces the amount of computational effort needed to compute the perturbed normal, because fewer components of the normal need to be computed.

However, using a two-dimensional normal may lead to anomalies if the unperturbed normal has no component, or only a very small component, perpendicular to the perturbation vector b (no z-component in case b has only x, y components).

This problem can be largely avoided by applying the perturbation in "screen coordinates", the components of the perturbation vector lying parallel to the screen plane onto which the image of the surface patch is projected to obtain a computer graphics image. In this way, the situation where the unperturbed normal has no component perpendicular to the perturbation vector occurs only along the silhouettes (positions where the line of sight is a tangent to the surface patch), where the specular reflection is not important for the visual impression anyway.

Of course, it may be feared that the use of the same b, irrespective of orientation of a surface might give rise to artifacts in animation. In this case, versions of the same underlying surface shape are shown in successive animation frames in a succession of different orientations. The normals are computed for those orientations and in each frame the same perturbation vector b is added to the unperturbed normal a point r of the surface patch, irrespective of how that normal is rotated due to the different orientations of the surface patch, i.e not rotated as the surface patch is rotated. The perturbed normal is used for computing specular reflection.

It has been found that using the same perturbation vector b does not cause disturbing artifacts even in such an animation. On the contrary, the reduced time for viewing individual frames makes the image more convincing.

The length of the perturbed normal is preferably normalized to 1. This is particularly important if the specular reflection is computed using a power of the scalar product of the perturbed normal and the half-angle vector H, because such a computation assumes that the scalar product can be at most equal to 1 (being a scalar product of vectors with unit length). If the scalar product would become greater than 1, a high power would result in unphysically high intensity specular reflections.

The normalization can be realized for example by dividing the scalar product of half angle vector H and the sum N+b of the unperturbed normal and the perturbation vector b, by the length of the sum before taking the power $\beta$. However, this requires considerable computational effort, because such a computation requires three multiplications, a square root and a division for every pixel. Therefore, this normalization is preferably approximated, for example by using a piecewise polynomial approximation for 1/square-root, or by writing $$[(N+b,H)/\sqrt{((N+b,N+b))}]^\beta = 2^{\beta(\log(N+b,H) - 0.5 \cdot \log((N+b,N+b)))}$$

and using a piece-wise linear approximation of "log x" and "$2^x$". It has been found that if the size of the pieces in which these functions are approximated linearly is so small that the error is less than 4%, both approximations yield perceptually acceptable images.

Figure 3:
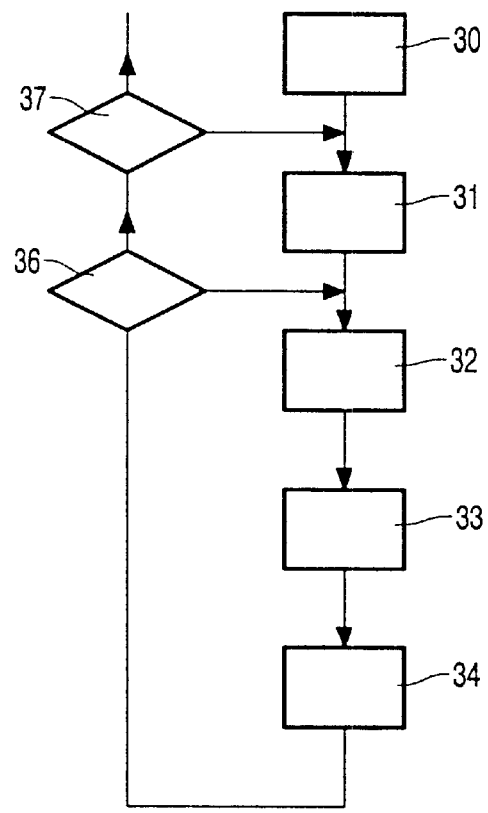
FIG. 3 shows a flow chart for computing an image

FIG. 3 shows a flow-chart for implementing the method. The flow chart contains an initial step 30, in which a model of a scene is constructed or loaded from storage, the model containing a description of a surface patch, for example in terms of triangles, normals at the corners of the triangles and mappings of points on the triangles onto bump maps. Furthermore the position and nature of light sources is described and the position an attitude of the viewpoint. If the viewpoint and the lightsource(s) are far away, the halfangle vector H is also determined, in a viewspace coordinate system, i.e. dependent on the viewing attitude. Otherwise the halfangle vector is determined on a pixel by pixel basis in later steps, also in the viewspace coordinate system.

In a second step 31 it is determined for the pixels of an image which surface patch is visible at each particular pixel according to the model. Subsequently the particular pixels are considered one by one, for example along scan lines. In a third step 32, one determines the texture coordinates u, v of the point r that is visible at a particular pixel and the normal N at the point in the viewspace coordinate system. This determination is performed e.g. by means of forward differences from a preceding pixel.

In a fourth step 33, a perturbation vector b corresponding to the texture coordinates u,v is read from a memory and added to the normal (instead of b, heights f may be read and for a number of neighboring u,v values, and the components of b may be computed as spatial differences in these heights). The perturbation vector b is not transformed into the viewspace coordinate system: the same perturbation vector b is used irrespective of the shape of the surface patch, the orientation of the surface patch at the point r and the mapping of points onto texture coordinates, even though the normal vector N determined for the point r is of course dependent on the orientation of the surface patch at the point r.

In a fifth step 34, a scalar product (H,N+b) is determined of the half angle vector H and the sum of the normal and the perturbation vector. This scalar product is normalized, to compensate for deviations from one of the length of N+b, and the power $\beta$ of the scalar product is taken. This power is used to compute contribution of specular reflection to image from light coming from the surface patch at the point r.

In a sixth step 35, it is tested whether all pixels of a surface patch (at least on a scan line) have been handled. If not, the method is repeated from the third step 32. Otherwise it is tested in a seventh step 36 whether all triangles have been handled. If so, the method finishes, otherwise the method is repeated from the second step 31 for a new triangle.

Figure 4:
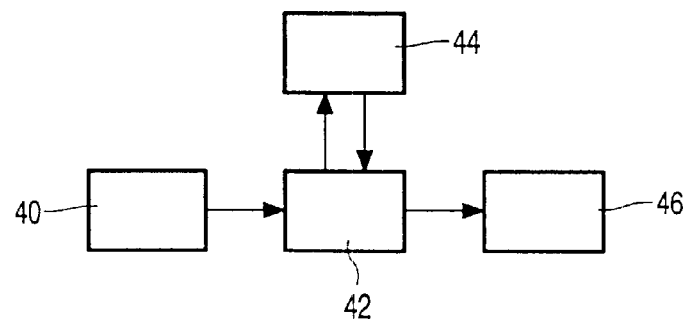
FIG. 4 shows a device for computing an image.

FIG. 4 shows a device for computing a graphics image. This device contains a model/triangle processing unit 40, a pixel processing unit 42, a bump map memory 44 and a display unit 46. In operation, the model/triangle processing unit 40 determines the model etc. It also determines which triangles are visible at which (set of) pixel(s). This information is communicated to the pixel processing unit 42, which determines the unperturbed normal N in viewspace coordinates and the texture coordinates associated with the point r that is visible at the pixel.

The texture coordinates are used to address the bump map memory 44, in order to retrieve the perturbation vector b. This vector is then added to the unperturbed normal, irrespective of the orientation of the normal and the mapping used to determine the texture coordinates. The sum of the unperturbed normal N and the perturbation vector b is used to compute the specular reflection. The result is supplied to the display unit 46 for display to a human viewer. It may also be stored in a memory unit (not shown) for later display at a display unit.

The model/triangle processing unit 40 may also handle animation, by starting the computation of a succession of image frames, showing the same surface patches, but with varying orientation and/or position or from various viewpoints.

What is claimed is:

1. A method for generating one or more computer graphics images using a bump mapped onto different curved surface patches, the method comprising for each surface patch:
   providing a mapping assigning a location in the bump map to each point on the surface patch;
   computing a halfangle vector, which bisects an angle between a line of sight to the surface patch and a line of lighting to the surface patch, the halfangle vector being computed in a coordinate system that is the same for all points on the surface patch;
   computing a normal to the surface patch for a point on the surface in said coordinate system in dependence on a shape of the surface patch;
   computing a scalar product of the halfangle vector H and a vector obtained by perturbing the normal in a direction defined by the bump map at the location assigned to said point, the direction defined by the bump map being the same for each different surface patch where said location is used, irrespective of the shape and orientation of the surface patch and the mapping;
   computing a specular reflection off the surface patch at said point from the scalar product.

2. A method according to claim 1, the coordinate system being a screen coordinate system, the direction lying in parallel to a screen plane perpendicular to a line of sight to a center of the image, for each point on the surface patch irrespective of a direction of the normal at that point.

3. A method according to claim 1 comprising normalizing the scalar product, to compensate for deviations from unit length of a perturbed normal obtained by said perturbing the normal.

4. A device for generating one or more computer graphics images using a bump mapped onto different curved surface patches, the device comprising.
   mapping means for providing a mapping assigning a location in the bump map to each point on the surface patch;
   halfangle computing means for computing a halfangle vector, which bisects an angle between a line of sight to a particular surface patch and a line of lighting to the particular surface patch, the halfangle vector being computed in a coordinate system that is the same for all points on the surface patch;
   unperturbed normal computing means for computing a normal to the surface patch for a point on the surface in said coordinate system in dependence on a shape of the surface patch;
   scalar product computing means for computing a scalar product of the halfangle vector H and a vector obtained by perturbing the normal in a direction defined by the bump map at the location assigned to said point, the direction defined by the bump map being the same for each different surface patch where said location is used, irrespective of the shape and orientation of the surface patch and the mapping;
   specular reflection computing means for computing a specular reflection off the particular surface patch at said point from the scalar product.

5. A computer readable medium storing a computer program for generating one or more computer graphics images using a bump mapped onto different curved surface patches, the program performing the steps for each surface patch of:

providing a mapping assigning a location in the bump map to each point on the surface patch;

computing a halfangle vector, which bisects an angle between a line of sight to the surface patch and a line of lighting to the surface patch, the halfangle vector being computed in a coordinate system that is the same for all points on the surface patch;

computing a normal to the surface patch for a point on the surface in said coordinate system in dependence on a shape of the surface patch;

computing a scalar product of the halfangle vector H and a vector obtained by perturbing the normal in a direction defined by the bump map at the location assigned to said point, the direction defined by the bump map being the same for each different surface patch where said location is used, irrespective of the shape and orientation of the surface patch and the mapping;

computing a specular reflection off the surface patch at said point from the scalar product.

\* \* \* \* \*